Patented June 8, 1926.

1,588,150

UNITED STATES PATENT OFFICE.

GEORGE A. SHINE, OF ST. LOUIS, MISSOURI.

PAINT.

No Drawing.    Application filed June 3, 1925. Serial No. 34,727.

My invention has relation to improvements in paints and relates to both a new product and the method of manufacturing the same more fully set forth in the specification and pointed out in the claims.

The principal object of the invention is to manufacture a paint in which reclaimed rubber is used as a filler and binder in lieu of linseed oil, commonly used, whereby I am enabled to cheaply manufacture a paint that possesses all the desirable qualities of a paint made with linseed oil.

In the manufacture of my improved paint I gather together a sufficient quantity of second-hand rubber, such as old tire inner tubes, and thoroughly clean the same with an ammonia solution to remove all foreign matter adhering thereto. The rubber stock is then cut into small pieces and placed in a suitable covered vessel over a flame and heated to a high temperature for the purpose of devulcanizing and melting the rubber. In another vessel I place a suitable quantity of a fossil resin such as amber resin and apply a flame thereto for the purpose of melting the resin. When the resin is completely melted I add to it a comparatively small quantity of hydrated lime after which the two fluids, that is the melted rubber and the melted resin mixture, are thoroughly mixed together. The amount of resin that is intermixed with the rubber is not a fixed quantity although at least an amount equal to about half that of the rubber by weight should be used to produce a desirable product.

The next step in the preparation of my improved paint is to thin the mixture of rubber and resin with the addition of benzine or other suitable hydrocarbon, the amount of thinning being of course considerably short of that necessary to produce the desired viscosity of the finished paint as the paint is of course put up in more or less concentrated form so that further thinning may be resorted to before use. To this intermixture of rubber and resin is then added zinc sulphate in a quantity equal to 10 percent by weight of the rubber and resin mixture. After thoroughly commingling the ingredients it is desirable to purify the paint mixture by centrifugal separation. It is well understood that by passing the mixture through a centrifugal separation, solid particles and other impurities are thrown out leaving behind the comparatively pure mixture free from gritty substances.

The mixture that has thus far been described is in itself a finished paint in concentrated form, the color of which is light amber very similar to the color of varnish. The texture of the paint is also similar to that of varnish due to the presence of resin which gives to the painted surface a hard gloss and at the same time enables the paint to flow readily. Should other colors be desired they may be readily obtained by the addition of other substances, such as is now done in the manufacture of paint. For instance, by the addition of a suitable quantity of zinc oxide or lithopone, the color may be changed to a light grey. This in turn can be darkened by addition of a small quantity of lamp black. Other colors are obtained in the same manner as is done at the present time. For instance, the addition of red oxide would produce a red and an addition of cobalt would produce a blue. This is well understood in the art and need not be further described.

The proportions herein mentioned obviously may be departed from as it might be desirable to produce paints varying in their physical properties and I do not wish to be restricted to any specific amount of ingredients herein set forth.

Having described my invention, I claim:

1. The process of manufacturing paint which comprises devulcanizing old rubber and heating the same until fused, mixing therewith a suitable fossil resin in fused condition, adding thereto while hot, a rubber solvent, and thoroughly commingling said substances.

2. The process of manufacturing paint which consists in devulcanizing and fusing reclaimed rubber, mixing therewith a suitable quantity of fused resin and hydrated lime, adding thereto while hot a suitable rubber solvent thinner and finally adding to the thinned mixture a quantity of zinc sulphate in an amount equal to about 10 percent by weight, of the mixture.

In testimony whereof I hereunto affix my signature.

GEORGE A. SHINE.